United States Patent
Kim et al.

(10) Patent No.: US 8,369,237 B2
(45) Date of Patent: Feb. 5, 2013

(54) APPARATUS AND METHOD FOR TRANSMITTING/RECEIVING PACKET IN DUAL MODEM MOBILE COMMUNICATION TERMINAL

(75) Inventors: Sun-Ju Kim, Suwon-si (KR); Jeong-Hoon Park, Suwon-si (KR); Sung-Wook Park, Seongnam-si (KR); Jai-Ho Lee, Anyang-si (KR); Jin-Won Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 12/807,334

(22) Filed: Sep. 2, 2010

(65) Prior Publication Data
US 2011/0058561 A1   Mar. 10, 2011

(30) Foreign Application Priority Data
Sep. 7, 2009  (KR) .......................... 10-2009-0084131

(51) Int. Cl.
*G01R 31/08*        (2006.01)

(52) U.S. Cl. ...... 370/252; 370/338; 375/222; 455/552.1
(58) Field of Classification Search .................. 370/252, 370/329, 331, 338, 401; 375/222; 379/88.12; 455/422.1, 552.1
See application file for complete search history.

(56) References Cited

U.S. PATENT DOCUMENTS

| | | | | |
|---|---|---|---|---|
| 5,892,957 | A | * | 4/1999 | Normoyle et al. ............ 710/263 |
| 2007/0270131 | A1 | * | 11/2007 | Oh .............................. 455/414.1 |
| 2009/0161629 | A1 | * | 6/2009 | Purkayastha et al. ......... 370/331 |

* cited by examiner

*Primary Examiner* — Jung Park (57) ABSTRACT

An apparatus and a method for transmitting/receiving a packet in a dual modem mobile communication terminal support data communication using both a host modem and a slave modem by additionally driving the slave modem when packet traffic is heavy. In the method for transmitting/receiving, at a host modem, a packet in a mobile communication terminal that includes the host modem and a slave modem, when a packet is received under a state where only the host modem is driven, it is determined whether a buffer count of the host modem is greater than a reference value. When the buffer count of the host modem is greater than the reference value, the slave modem is additionally driven and the received packet is provided to the slave modem.

24 Claims, 10 Drawing Sheets

APPARATUS AND METHOD FOR TRANSMITTING/RECEIVING PACKET IN DUAL MODEM MOBILE COMMUNICATION TERMINAL

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Sep. 7, 2009 and assigned Serial No. 10-2009-0084131, the entire disclosure of which is hereby incorporated by reference.

TECHNICAL FIELD OF THE INVENTION

The present invention relates to an apparatus and a method for transmitting/receiving a packet in a dual modem mobile communication terminal. More particularly, the present invention relates to an apparatus and a method for supporting data communication using both a host modem and a slave modem by additionally driving the slave modem when packet traffic is heavy while a dual modem mobile communication terminal supports data communication using the host modem.

BACKGROUND OF THE INVENTION

As distribution and use of a mobile terminal communication increase, terminals that provide various functions are under development. Recently, a dual modem mobile communication terminal that can use two kinds of wireless communication networks was brought into the market. The dual modem mobile communication terminal can be used in an area where different networks are mixed or when a user roams into a network of a different service provider.

A general exclusive terminal that supports one wireless communication system can perform communication in only a service area of a relevant wireless communication system. In contrast, a dual modem mobile communication terminal (e.g., a dual modem mobile communication terminal that supports a Long Term Evolution (LTE) system and a Wireless Fidelity (WiFi) system) can perform communication in an LTE service area and a WiFi service area, such that its utility is high.

The conventional dual modem mobile communication terminal uses a method of supporting data communication using only one modem at a time in an area of a range supported by each modem. Accordingly, since the other modem that does not support the data communication goes into idle state, the terminal and a system resource are inefficiently used.

SUMMARY OF THE INVENTION

To address the above-discussed deficiencies of the prior art, an aspect of the present invention is to address at least the above-mentioned problems and/or disadvantages and to provide at least the advantages described below. Accordingly, an aspect of the present invention is to provide an apparatus and a method for transmitting/receiving a packet in a dual modem mobile communication terminal.

Another aspect of the present invention is to provide an apparatus and a method for transmitting/receiving a packet by efficiently using the terminal and a system resource in the dual modem mobile communication terminal.

Yet another aspect of the present invention is to provide an apparatus and a method for supporting data communication using both a host modem and a slave modem by additionally driving the slave modem when packet traffic is heavy while a dual modem mobile communication terminal supports data communication using the host modem.

In accordance with an aspect of the present invention, a method for transmitting/receiving, at a host modem, a packet in a mobile communication terminal that includes the host modem and a slave modem is provided. The method includes, when a packet is received under a state in which only the host modem is driven, determining whether a buffer count of the host modem is greater than a reference value. When the buffer count of the host modem is greater than the reference value, the slave modem is additionally driven, and the received packet is provided to the slave modem.

In accordance with another aspect of the present invention, a method for transmitting/receiving, at a slave modem, a packet in a mobile communication terminal that includes a host modem and the slave modem is provided. The method includes, when a buffer count of the host modem is greater than a reference value under a state in which only the host modem is driven and a control message including at least one of a source Internet Protocol (IP) address, a destination IP address, a source port number, a destination port number, and a protocol type of a packet, and Quality of Service (QoS) information is received from the host modem, driving the slave modem and being allocated an IP address from an IP network, setting a radio bearer to be used for packet transmission based on the QoS information, and generating a control message including session identifier information corresponding to the radio bearer and the allocated IP address and transmitting the same to the host modem.

In accordance with another aspect of the present invention, an apparatus for transmitting/receiving, at a host modem, a packet in a mobile communication terminal that includes the host modem and a slave modem is provided. The apparatus includes a packet transceiver for receiving a packet. The apparatus also includes a controller for, when a packet is received under a state in which only the host modem is driven, determining whether a buffer count of the host modem is greater than a reference value and, when the buffer count of the host modem is greater than the reference value, additionally driving the slave modem and outputting the received packet to a control message generator/processor in order to provide the received packet to the slave modem.

In accordance with yet another aspect of the present invention, an apparatus for transmitting/receiving, at a slave modem, a packet in a mobile communication terminal that includes a host modem and the slave modem is provided. The apparatus includes a control message transceiver for, when a buffer count of the host modem is greater than a reference value under a state in which only the host modem is driven, receiving a control message including at least one of a source Internet Protocol (IP) address, a destination IP address, a source port number, a destination port number, and a protocol type of a packet, and Quality of Service (QoS) information from the host modem. The apparatus also includes a controller for being allocated an IP address from an IP network when the control message is received, a session manager for setting a radio bearer to be used for packet transmission based on the QoS information, and a control message generator/processor for generating a control message including session Identifier (ID) information corresponding to the radio bearer and the allocated IP address and transmitting the control message to the host modem.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication terminal.

Exemplary embodiments of the present invention provide an apparatus and a method for transmitting/receiving a packet using a dual modem in a dual modem mobile communication terminal that includes the dual modem, that is, a host modem and a slave modem. More particularly, exemplary embodiments of the present invention provide a technique for supporting data communication using both a host modem and a slave modem by additionally driving the slave modem when packet traffic is heavy while a dual modem mobile communication terminal supports data communication using the host modem.

In the following description, a dual modem mobile communication terminal denotes a mobile communication terminal that mounts a modem that supports two different high speed wireless data communication technologies. For example, the high speed wireless data communication technologies may include LTE, evolved High-Rate Packet Data (eHRPD), WiFi, and High-Speed Packet Access (HSPA).

In addition, according to an embodiment of the present invention, a situation in which a dual modem mobile communication terminal is connected with an external terminal (for example, a Personal Computer (PC), a notebook, and such) via an interface, and the external terminal performs data communication using the dual modem mobile communication terminal as a wireless modem is described. That is, the situation in which a dual modem inside the dual modem mobile communication terminal receives a packet occurring during execution of an application (for example, electronic (e)-mail, Voice over Internet Protocol (VoIP), and net meeting) inside the external terminal and transmits the received packet to a network, and the dual modem inside the dual modem mobile communication terminal receives a packet from the network and transmits the received packet to the external terminal is described. However, an embodiment of the present invention is also readily applicable when transmitting a packet that occurs during execution of an application inside a host modem of the dual modem mobile communication terminal to a network and receiving a packet from the network to the host modem.

Figure 1:
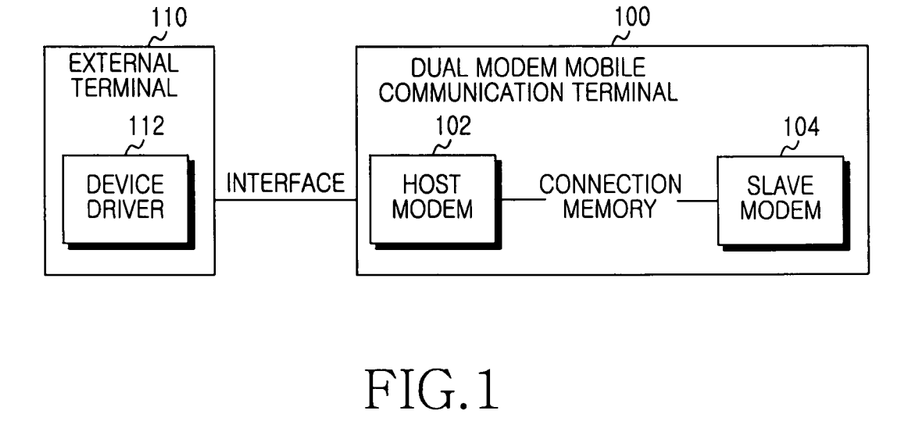
FIG. 1 illustrates an external terminal and a dual modem mobile communication terminal according to an embodiment of the present invention.

FIG. 1 illustrates an external terminal and a dual modem mobile communication terminal according to an embodiment of the present invention.

Referring to FIG. 1, a dual modem mobile communication terminal 100 and an external terminal 110 are connected via an interface. For example, the interface may include Universal Serial Bus (USB) and Personal Computer Memory Card International Association (PCMCIA).

The external terminal 110 performs data communication using the dual modem mobile communication terminal 100 as a wireless modem of the external terminal 110. The external terminal 110 may be a PC, a notebook, and such. The external terminal 110 includes a device driver 112 for recognizing a host modem 102 inside the dual modem mobile communication terminal 100. The device driver 112 transmits a packet occurring during execution of an application (for example, an e-mail, VoIP, net meeting) inside the external terminal 110 to the host modem 102 via the interface, and provides a packet received from the host modem 102 to the application via the interface.

The dual modem mobile communication terminal 100 includes the host modem 102 and a slave modem 104, and supports data communication using the dual modems 102 and 104. The host modem 102 and the device driver 112 of the external terminal 110 are connected via the interface, and the host modem 102 and the slave modem 104 are connected via a connection memory. The connection memory serves as a memory that the host modem 102 and the slave modem 104 simultaneously access to give and take necessary data. The connection memory may be a Dual Ported Random Access Memory (DPRAM).

The host modem 102 inside the dual modem mobile communication terminal 100 transmits a packet received from the device driver 112 to a network, and transfers a packet received from the network to the device driver 112 via the interface. Packet traffic is heavy while the host modem 102 supports data communication, and the dual modem mobile communication terminal 100 additionally drives the slave modem 104 to support the data communication using both the host modem 102 and the slave modem 104.

To support data communication, the host modem and the slave modem, according to an embodiment of the present invention, generate and manage a packet filter list. The packet filter list may be classified into a packet filter list for a host modem and a packet filter list for a slave modem. For example, the lists may be configured according to Table 1 and Table 2, respectively.

TABLE 1 packet filter list for a host modem

| Session ID | source IP address | destination IP address | source port number | destination port number | protocol type |
|---|---|---|---|---|---|
| s1 | a1 | b1 | c1 | d1 | e1 |
| s2 | a2 | b2 | c2 | d2 | e2 |

TABLE 2

| Session ID | source IP address | destination IP address | source port number | destination port number | protocol type |
|---|---|---|---|---|---|
| s3 | a3 | b3 | c3 | d3 | e3 |
| s4 | a4 | b4 | c4 | d4 | e4 |

Here, as shown in Table 1 and Table 2, the packet filter list includes session Identifier (ID) information, and attribute information mapped thereto. The attribute information includes information such as a source IP address, a destination IP address, a source port number, a destination port number, and a protocol type of a packet. As will be described further below, a portion of the information may be excluded, and more information may be added. The host modem manages both the packet filter list for the host modem and the packet filter list for the slave modem. The slave modem manages the packet filter list for the slave modem.

Figure 2:
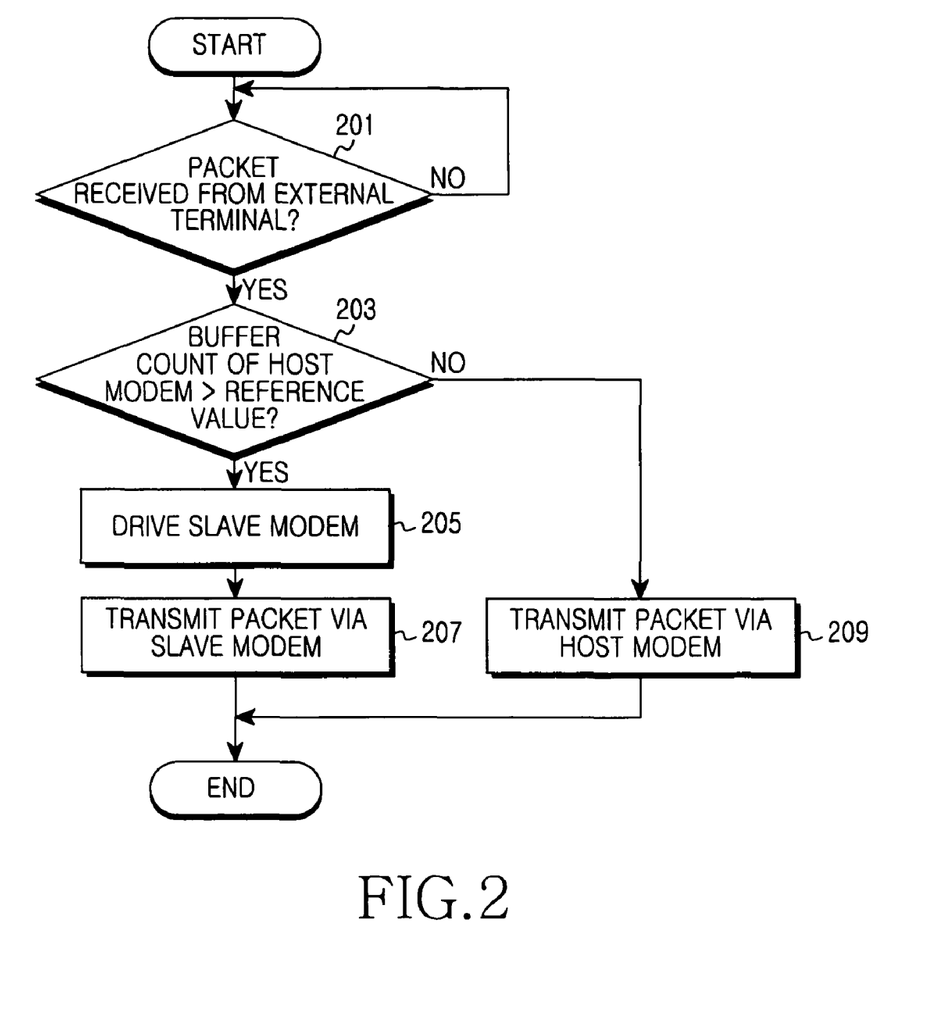
FIG. 2 illustrates a process for transmitting/receiving a packet in a dual modem mobile communication terminal according to an embodiment of the present invention.

FIG. 2 illustrates a process for transmitting/receiving a packet in a dual modem mobile communication terminal according to an embodiment of the present invention.

Referring to FIG. 2, the dual modem mobile communication terminal determines whether a packet is received from an external terminal via an interface in block 201. When a packet is received from the external terminal, the dual modem mobile communication terminal determines whether a buffer count of a host modem is greater than a reference value in block 203.

When the buffer count of the host modem is greater than the reference value in block 203, the dual modem mobile communication terminal determines packet traffic whose transmission via the host modem is currently heavy, drives a slave modem in block 205, and transmits the received packet to a network via the slave modem in block 207.

In contrast, when the buffer count of the host modem is not greater than the reference value in block 203, the dual modem mobile communication terminal determines packet traffic whose transmission via the host modem is not currently heavy and continues to transmit the received packet to the network via the host modem in block 209.

Upon completion, the dual modem mobile communication terminal ends the algorithm according to an embodiment of the present invention.

Figure 3:
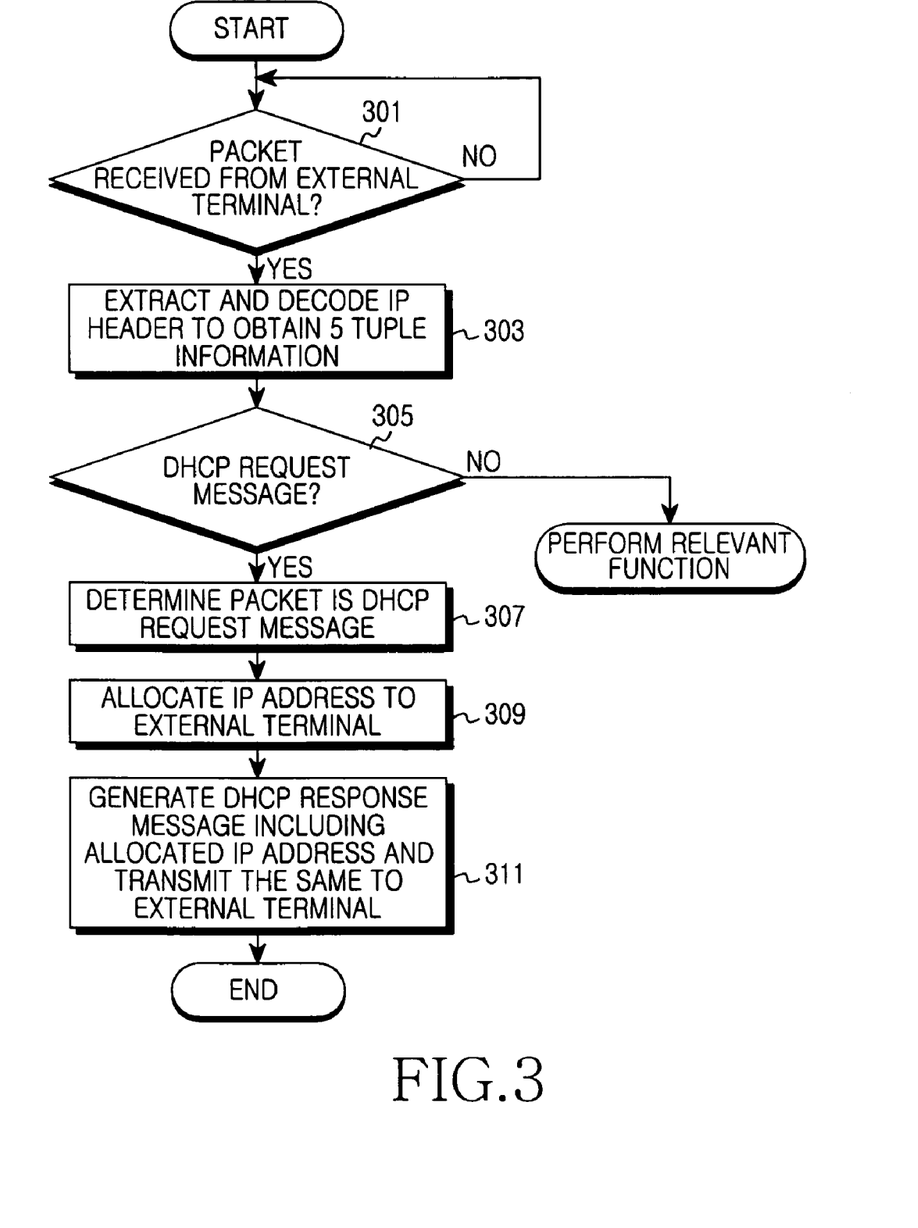
FIG. 3 illustrates a process for allocating, at a host modem, an IP address to an external terminal in a dual modem mobile communication terminal according to an embodiment of the present invention.

FIG. 3 illustrates a process for allocating, at a host modem, an IP address to an external terminal in a dual modem mobile communication terminal according to an embodiment of the present invention.

Referring to FIG. 3, the host modem inside the dual modem mobile communication terminal determines whether a packet is received from an external terminal via an interface in block 301.

When the packet is received from the external terminal via the interface in block 301, the host modem extracts and decodes an IP header from the received packet to obtain attribute information in block 303. Here, the attribute information includes information such as a source IP address, a destination IP address, a source port number, a destination port number, a protocol type of a packet, and such.

The host modem determines whether the received packet is a Dynamic Host Configuration Protocol (DHCP) request message for requesting IP address allocation in block 305. Here, the DHCP request message for requesting the IP address allocation has a source port number 68 or a destination port number 67.

When the source port number of the received packet is not 68 or the destination port number is not 67 in block 305, the host modem performs a relevant function on the received packet based on the obtained attribute information.

In contrast, when the source port number of the received packet is 68 or the destination port number is 67 in block 305, the host modem determines that the received packet is a DHCP request message for requesting IP address allocation in block 307 and allocates an IP address on the external terminal in block 309.

The host modem generates a DHCP response message that includes the allocated IP address and transmits the generated DHCP response message to the external terminal via the interface in block 311.

Upon completion, the host modem ends the algorithm according to an embodiment of the present invention.

Figure 4:
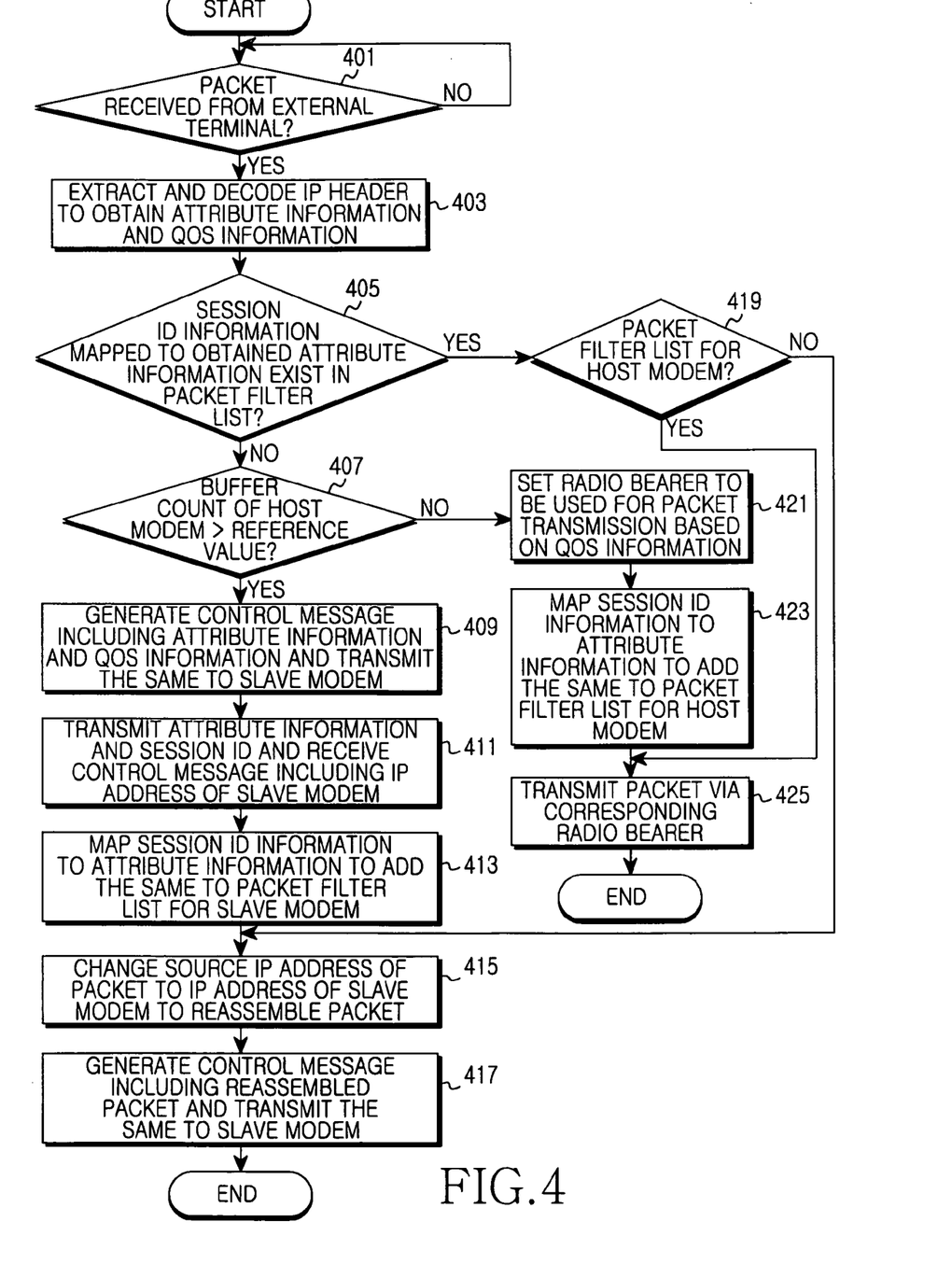
FIG. 4 illustrates a process for controlling to directly transmit, at a host modem, a packet received from an external terminal to a network, or drive a slave modem to allow the slave modem to transmit the packet to the network in a dual modem mobile communication terminal according to an embodiment of the present invention.

FIG. 4 illustrates a process at a host modem for controlling to directly transmit a packet received from an external terminal to a network, or drive a slave modem to allow the slave modem to transmit the packet to the network in a dual modem mobile communication terminal according to an embodiment of the present invention.

Referring to FIG. 4, the host modem inside the dual modem mobile communication terminal determines whether a packet is received from the external terminal via an interface in block 401.

When the packet is received from the external terminal in block 401, the host modem extracts and decodes an IP header from the received packet to obtain attribute information and QoS information in block 403. Here, the attribute information includes information such as a source IP address, a destination IP address, a source port number, a destination port number, a protocol type of a packet, and such.

The host modem determines whether session ID information mapped to the obtained attribute information exists in a packet filter list stored in a memory in block 405.

When the session ID information mapped to the obtained attribute information does not exist in the packet filter list stored in the memory in block 405, the host modem determines whether a buffer count of the host modem itself is greater than a reference value in block 407.

When the buffer count of the host modem itself is greater than the reference value in block 407, the host modem determines packet traffic whose transmission via the host modem is required is currently heavy, additionally drives the slave modem, generates a control message including the obtained attribute information and QoS information, and transmits the control message to the slave modem in block 409. Here, the host modem and the slave modem are connected via a connection memory.

The host modem receives a control message including the attribute information, session ID information mapped thereto, and an IP address of the slave modem from the slave modem in block 411, and maps the session ID information to the attribute information to add the same to a packet filter list for the slave modem managed by the host modem in block 413.

The host modem changes a source IP address of the received packet to an IP address of the slave modem to reassemble the packet in block 415, and generates a control message including the reassembled packet to transmit the same to the slave modem in block 417, and ends the algorithm according to an embodiment of the present invention.

In contrast, when the buffer count of the host modem itself is not greater than the reference value in block 407, the host modem determines packet traffic whose transmission via the host modem is required is not currently heavy and sets a radio bearer to be used for packet transmission based on the obtained QoS information in block 421.

The host modem maps session ID information corresponding to the radio bearer to the attribute information to add the same to a packet filter list for the host modem managed by the host modem itself in block 423, transmits the packet to a network via the radio bearer corresponding to the session ID information in block 425, and ends the algorithm according to an embodiment of the present invention.

When the session ID information mapped to the obtained attribute information exists in the packet filter list stored in the memory in block 405, the host modem determines whether the packet filter list where the session ID information mapped to the obtained attribute information exists is a packet filter list for the host modem in block 419.

When the packet filter list where the session ID information mapped to the obtained attribute information exists is the packet filter list for the host modem in block 419, the host modem transmits the packet to the network via a radio bearer corresponding to the session ID information in block 425, and ends the algorithm according to an embodiment of the present invention.

In contrast, when the packet filter list where the session ID information mapped to the obtained attribute information exists is the packet filter list for the slave modem in block 419, the host modem changes a source IP address of the received packet to an IP address of the slave modem to reassemble the packet in block 415, generates a control message including the reassembled packet to transmit the same to the slave modem in block 417, and ends the algorithm according to an embodiment of the present invention.

Figure 5:
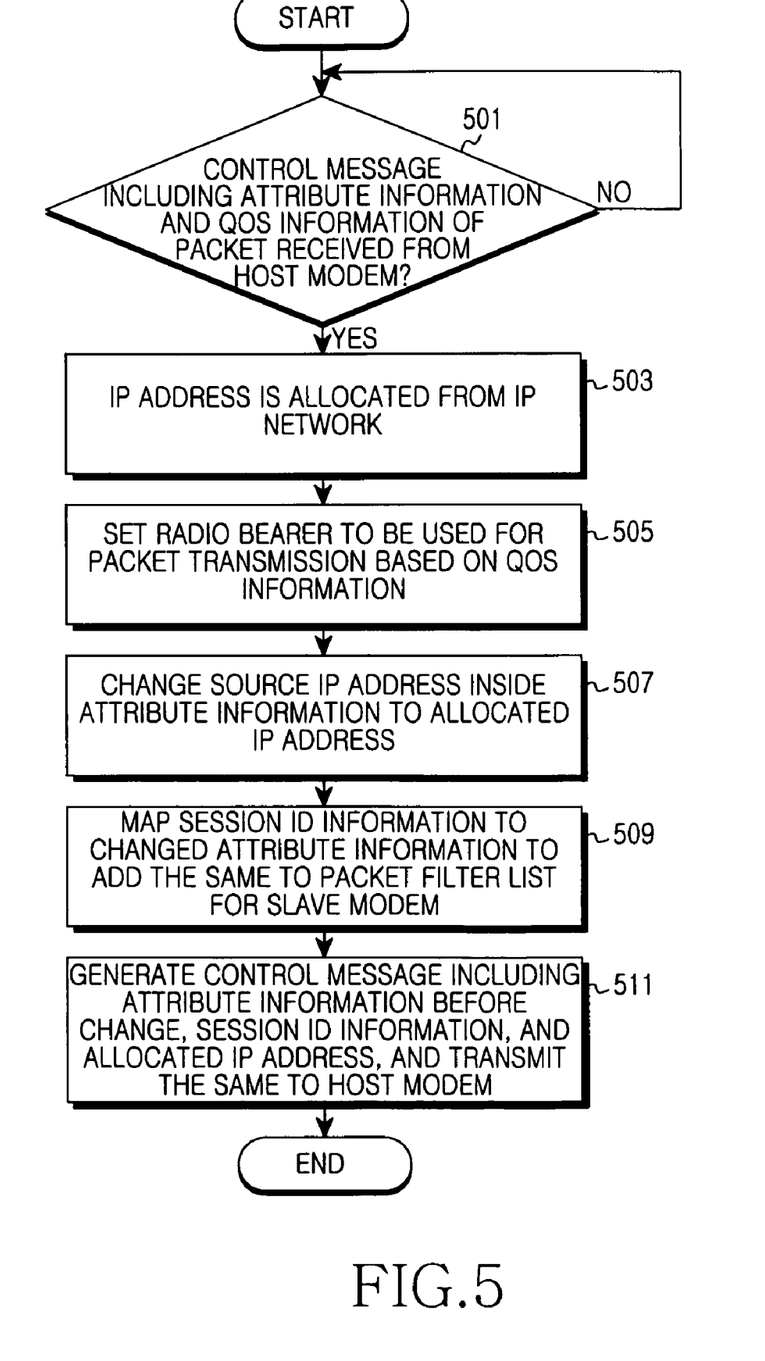
FIG. 5 illustrates a process for driving a slave modem under control of a host modem and being allocated an IP address from a network in a dual modem mobile communication terminal according to an embodiment of the present invention.

FIG. 5 illustrates a process for driving a slave modem under control of a host modem and being allocated an IP address from a network in a dual modem mobile communication terminal according to an embodiment of the present invention.

Referring to FIG. 5, the slave modem inside the dual modem mobile communication terminal determines whether a control message including attribute information and QoS information of a packet is received from the host modem in block 501. Here, the attribute information includes information such as a source IP address, a destination IP address, a source port number, a destination port number, a protocol type of a packet, and such. The host modem and the slave modem are connected via a connection memory.

When the control message including the attribute information and QoS information of the packet is received from the host modem in block 501, the slave modem is allocated an IP address from an IP network in block 503.

The slave modem sets a radio bearer to be used for packet transmission based on the QoS information obtained through the control message in block 505.

The slave modem changes a source IP address inside the attribute information obtained through the control message into the IP address allocated from the IP network in block 507.

The slave modem maps session ID information corresponding to the radio bearer to the changed attribute information to add the same to a packet filter list of the slave modem managed by the slave modem itself in block 509.

The slave modem generates a control message including the attribute information before the change (that is, the attribute information obtained through the control message), the session ID information, and the allocated IP address, and transmits the control message to the host modem in block 511.

Upon completion, the slave modem ends the algorithm according to an embodiment of the present invention.

Figure 6:
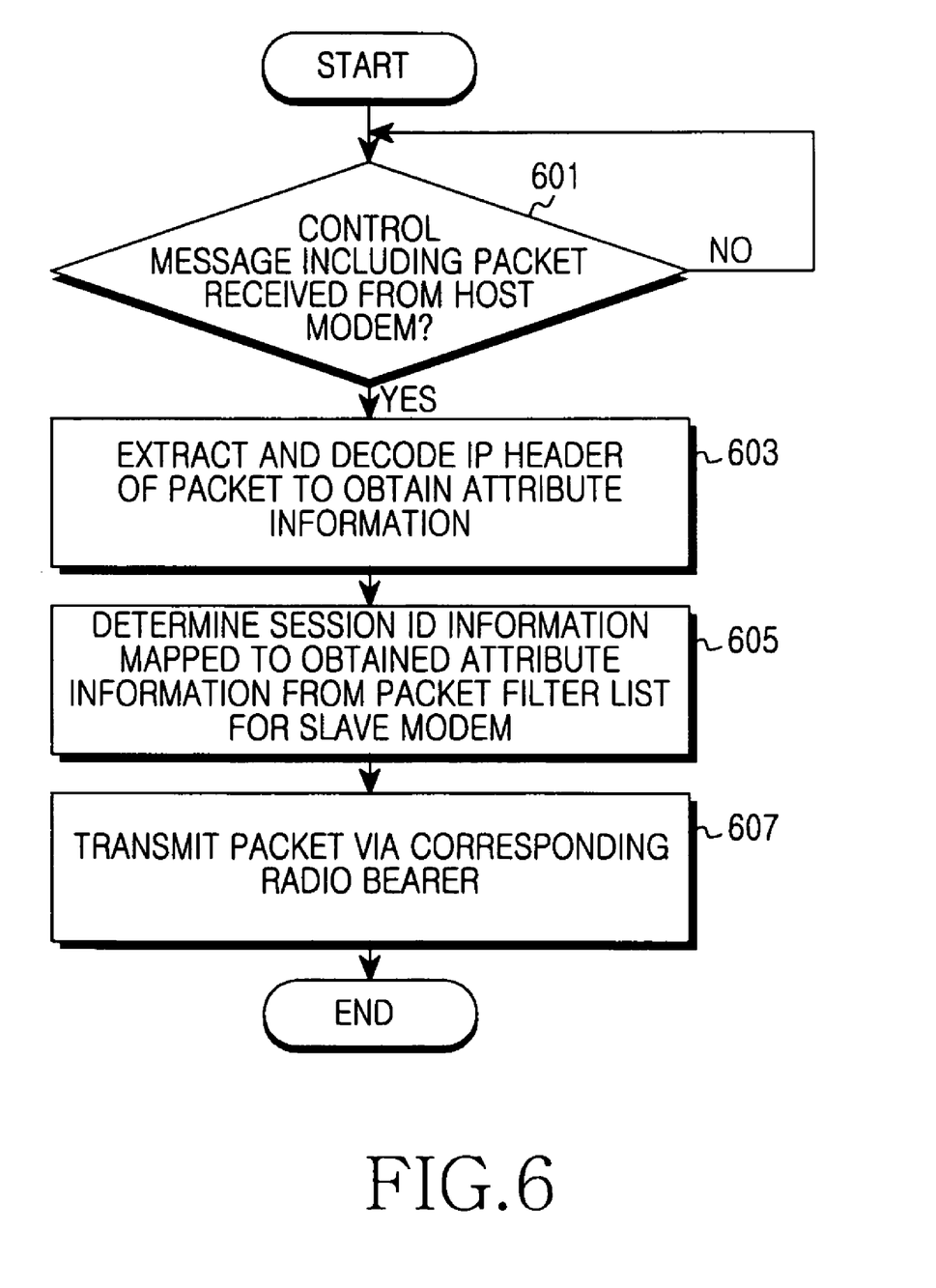
FIG. 6 illustrates a process for transmitting, at a slave modem, a packet received from a host modem to a network under control of the host modem in a dual modem mobile communication terminal according to an embodiment of the present invention.

FIG. 6 illustrates a process for transmitting, at a slave modem, a packet received from a host modem to a network under control of the host modem in a dual modem mobile communication terminal according to an embodiment of the present invention.

Referring to FIG. 6, the slave modem inside the dual modem mobile communication terminal determines whether a control message including a packet is received from the host modem in block 601. Here, the host modem and the slave modem are connected via a connection memory.

When the control message including the packet is received from the host modem in block 601, the slave modem extracts and decodes an IP header from the received packet to obtain attribute information in block 603. Here, the attribute information includes information such as a source IP address, a destination IP address, a source port number, a destination port number, a protocol type of a packet, and such.

The slave modem determines session ID information mapped to the obtained attribute information in a packet filter list for the slave modem managed by the slave modem itself in block 605, and transmits the received packet to a network via a radio bearer corresponding to the determined session ID information in block 607.

Upon completion, the slave modem ends the algorithm according to an embodiment of the present invention.

Figure 7:
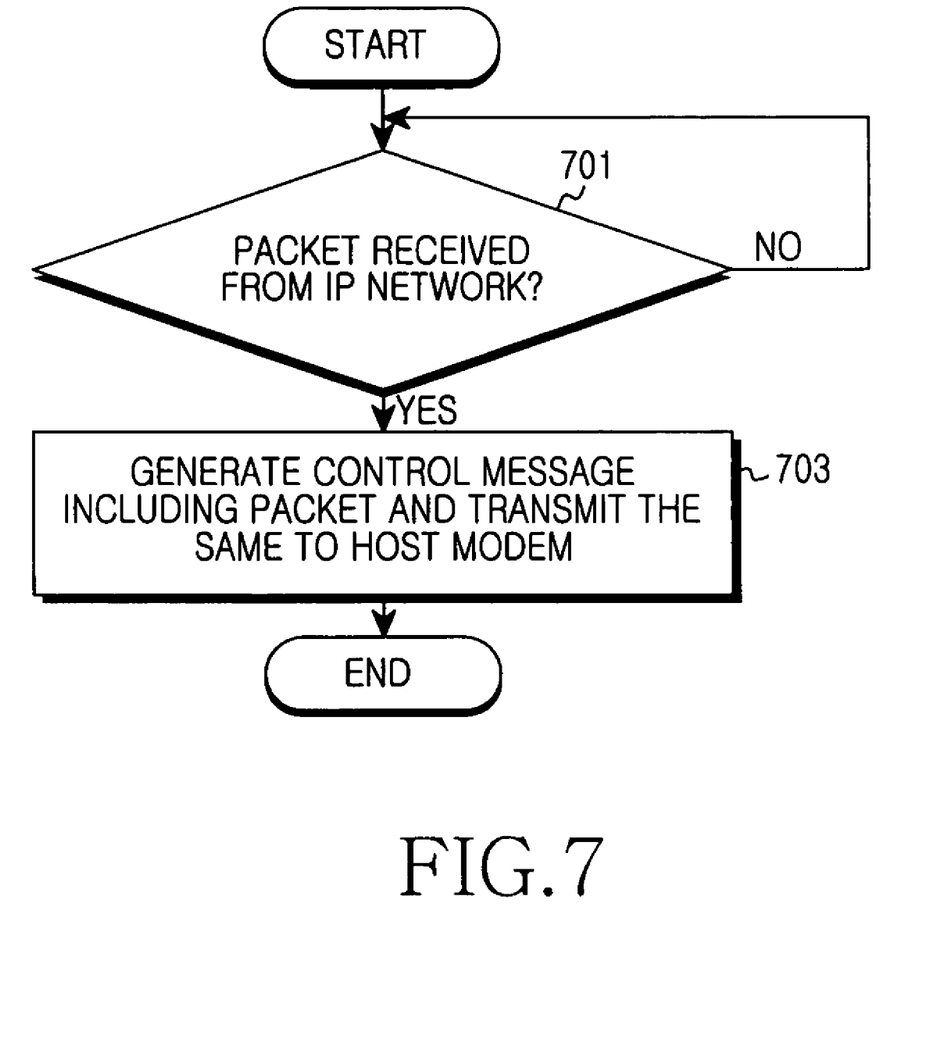
FIG. 7 illustrates a process for transmitting, at a slave modem, a packet received from a network to a host modem in a dual modem mobile communication terminal according to an embodiment of the present invention.

FIG. 7 illustrates a process for transmitting, at a slave modem, a packet received from a network to a host modem in a dual modem mobile communication terminal according to an embodiment of the present invention.

Referring to FIG. 7, the slave modem inside the dual modem mobile communication terminal determines whether a packet is received from an IP network in block 701.

When a packet is received from the IP network in block 701, the slave modem generates a control message including the packet and transmits the same to the host modem in block 703. Here, the host modem and the slave modem are connected via a connection memory.

Upon completion, the slave modem ends the algorithm according to an embodiment of the present invention.

Figure 8:
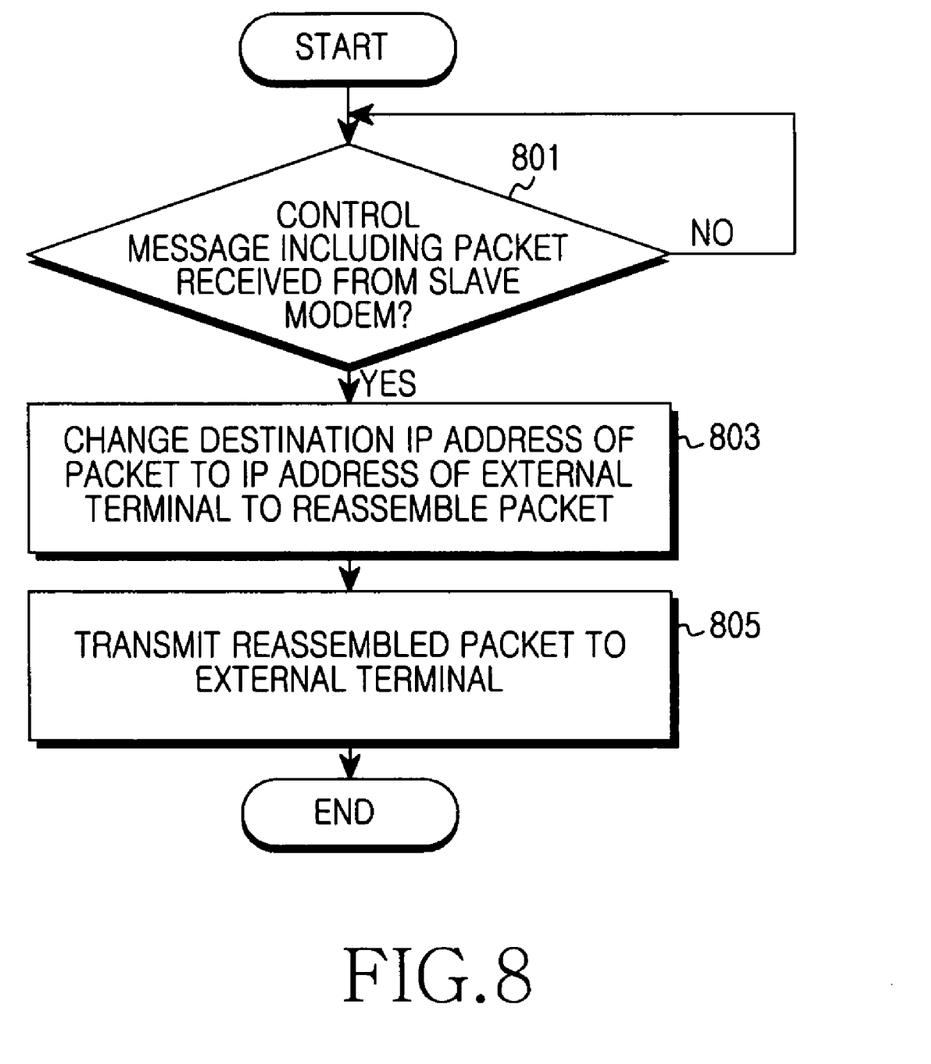
FIG. 8 illustrates a process for transmitting, at a host modem, a packet received from a slave modem to an external terminal in a dual modem mobile communication terminal according to an embodiment of the present invention.

FIG. 8 illustrates a process for transmitting, at a host modem, a packet received from a slave modem to an external terminal in a dual modem mobile communication terminal according to an embodiment of the present invention.

Referring to FIG. 8, the host modem inside the dual modem mobile communication terminal determines whether a control message including a packet is received from the slave modem in block 801. Here, the host modem and the slave modem are connected via a connection memory.

When the control message including the packet is received from the slave modem in block 801, the host modem changes a destination IP address of the received packet to an IP address of an external terminal to reassemble the packet in block 803 and transmits the reassembled packet to the external terminal in block 805.

Upon completion, the host modem ends the algorithm according to an embodiment of the present invention.

Figure 9:
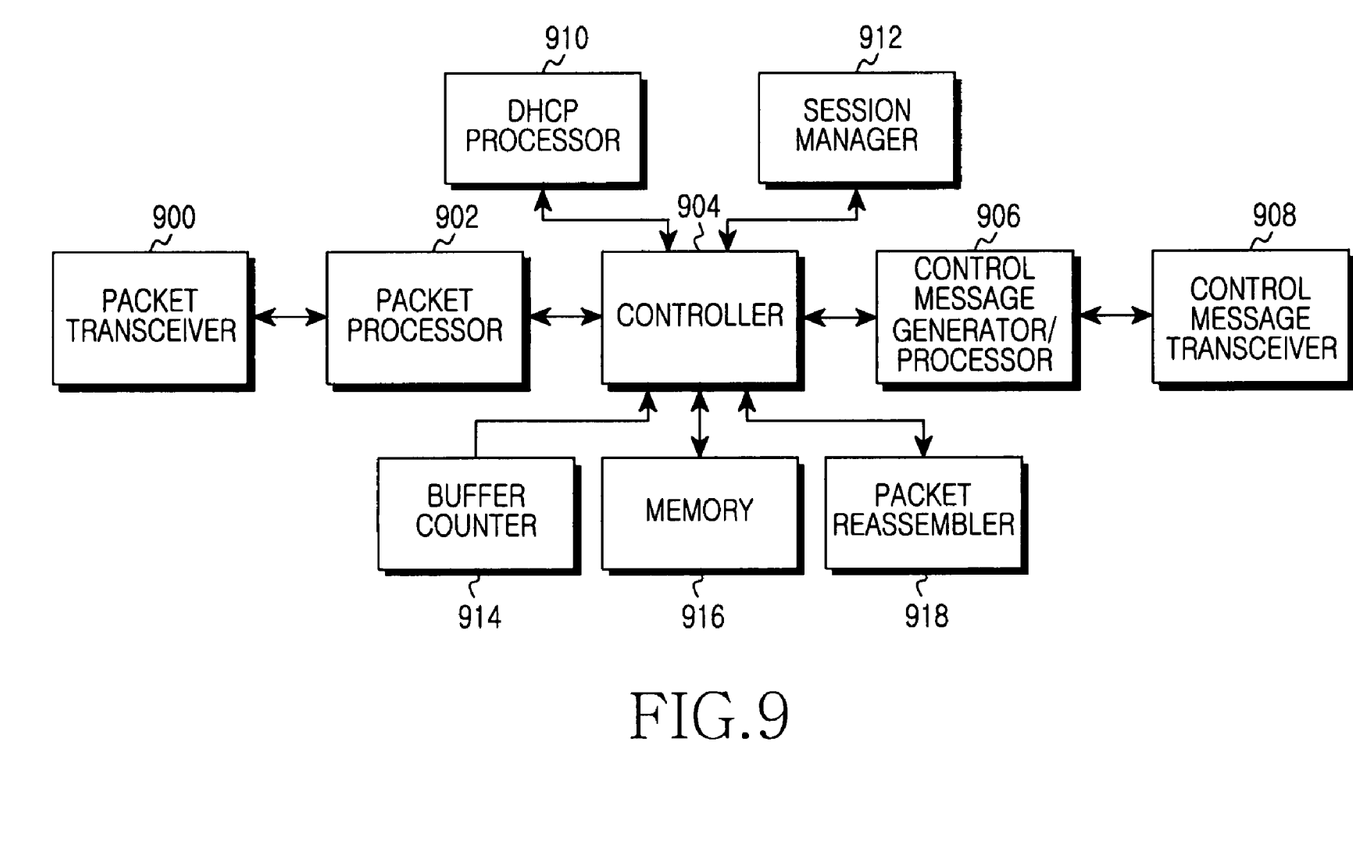
FIG. 9 illustrates a host modem inside a dual modem mobile communication terminal according to an embodiment of the present invention.

FIG. 9 illustrates a host modem inside a dual modem mobile communication terminal according to an embodiment of the present invention.

Referring to FIG. 9, the host modem includes a packet transceiver 900, a packet processor 902, a controller 904, a control message generator/processor 906, a control message transceiver 908, a DHCP processor 910, a session manager 912, a buffer counter 914, a memory 916, and a packet reassembler 918.

Referring to FIG. 9, the packet transceiver 900 provides a packet received from an external terminal via an interface to the packet processor 902, and outputs a packet received from the packet processor 902 to the external terminal via the interface.

The packet processor 902 extracts and decodes an IP header from a packet input from the packet transceiver 900 to obtain attribute information and QoS information, and provides the received packet and the obtained attribute information and QoS information to the controller 904. In addition, the packet processor 902 provides a packet input from the controller 904 to the packet transceiver 900.

The controller 904 receives a packet from an external terminal and attribute information of the packet via the packet processor 902 and determines whether the packet is a DHCP request message based on the attribute information. When the packet is the DHCP request message, the controller 904 provides the DHCP request message to the DHCP processor 910. Accordingly, when the DHCP processor 910 provides a DHCP response message including an IP address assigned to the external terminal, the controller 904 provides the DHCP response message to the packet processor 902 and stores the IP address allocated to the external terminal in the memory 916.

In addition, the controller 904 receives a packet from the external terminal and attribute information and QoS information of the packet via the packet processor 902 and determines a packet filter list for the host modem and a packet filter list for a slave modem stored in the memory 916 to determine whether session ID information mapped to the attribute information of the packet exists. When the session ID information mapped to the attribute information of the packet exists in the packet filter list of the host modem, the controller 904 provides the packet and the session ID information to the session manager 912 to control the session manager 912 to transmit the packet to a network via a radio bearer corresponding to the session ID information. When the session ID information mapped to the attribute information of the packet exists in the packet filter list of the slave modem, the controller 904 provides the packet to the packet reassembler 918 to control to change a source IP address of the packet to an IP address of the slave modem to reassemble the packet and provides the reassembled packet to the control message generator/processor 906 to control to generate a control message including the reassembled packet. The above-generated control message is transmitted to the slave modem via the control message transceiver 908.

In addition, when the session ID information mapped to the attribute information of the packet does not exist in a packet filter list managed by the host modem, the controller 904 determines a buffer count of the buffer counter 914 to determine whether the determined buffer count is greater than a reference value. When the determined buffer count is greater than the reference value, the controller 904 provides the attribute information and QoS information to the control message generator/processor 906 to control to generate a control message including the attribute information and QoS information. The generated control message is transmitted to the slave modem via the control message transceiver 908. Afterwards, when the attribute information, session ID information mapped thereto, and an IP address of the slave modem are received from the control message generator/processor 906, the controller 904 maps the session ID information to the attribute information to add the same to a packet filter list for the slave modem of the memory 916 and stores the IP address of the slave modem in the memory 916. When the determined buffer count is not greater than the reference value, the controller 904 provides the QoS information to the session manager 912 to control the session manager 912 to set a radio bearer to be used for packet transmission based on the QoS information. Accordingly, when the session manager 912 sets a radio bearer for the packet and provides session ID information corresponding to the set radio bearer to the controller 904, the controller 904 maps the session ID information to attribute information of the packet to add the same to a packet filter list for the host modem of the memory 916.

In addition, when a packet is received from the control message generator/processor 906, the controller 904 provides the packet to the packet reassembler 918 to control to change a destination IP address of the packet to an IP address of an external terminal and reassemble the packet, and provides the reassembled packet to the packet processor 902. The reassembled packet provided by the packet processor 902 is transmitted to the external terminal via the packet transceiver 900.

The control message generator/processor 906 generates a control message including information or a packet input from the controller 904 under control of the controller 904 to provide the generated control message to the control message transceiver 908 and extracts information or a packet from the control message input from the control message transceiver 908 to provide the extracted information or packet to the controller 904.

The control message transceiver 908 outputs a control message input from the control message generator/processor 906 to the slave modem connected via a connection memory and provides a control message input from the slave modem via the connection memory to the control message generator/processor 906.

When a DHCP request message is received from the controller 904, the DHCP processor 910 allocates an IP address to an external terminal and generates a DHCP response message including the allocated IP address to provide the same to the controller 904.

The session manager 912 receives a packet and session ID information from the controller 904 under control of the controller 904 and transmits the received packet to a network via a radio bearer corresponding to the session ID information. In addition, the session manager 912 receives QoS information of a packet from the controller 904, sets a radio bearer to be used for packet transmission based on the QoS information, and provides session ID information corresponding to the set radio bearer to the controller 904.

The buffer counter 914 counts packets buffered in a buffer of the host modem. A buffer count counted by the buffer counter 914 indicates a size of the buffer consequently.

The memory 916 stores and manages the packet filter list for the host modem and the packet filter list for the slave modem. In addition, the memory 916 stores an IP address allocated to an external terminal and an IP address of the slave modem received from the slave modem.

The packet reassembler 918 changes a source IP address of a packet input from the controller 904 into an IP address of the slave modem to reassemble the packet, or changes a destination IP address of a packet into an IP address of an external terminal to reassemble the packet under control of the controller 904 and provides the reassembled packet to the controller 904.

Figure 10:
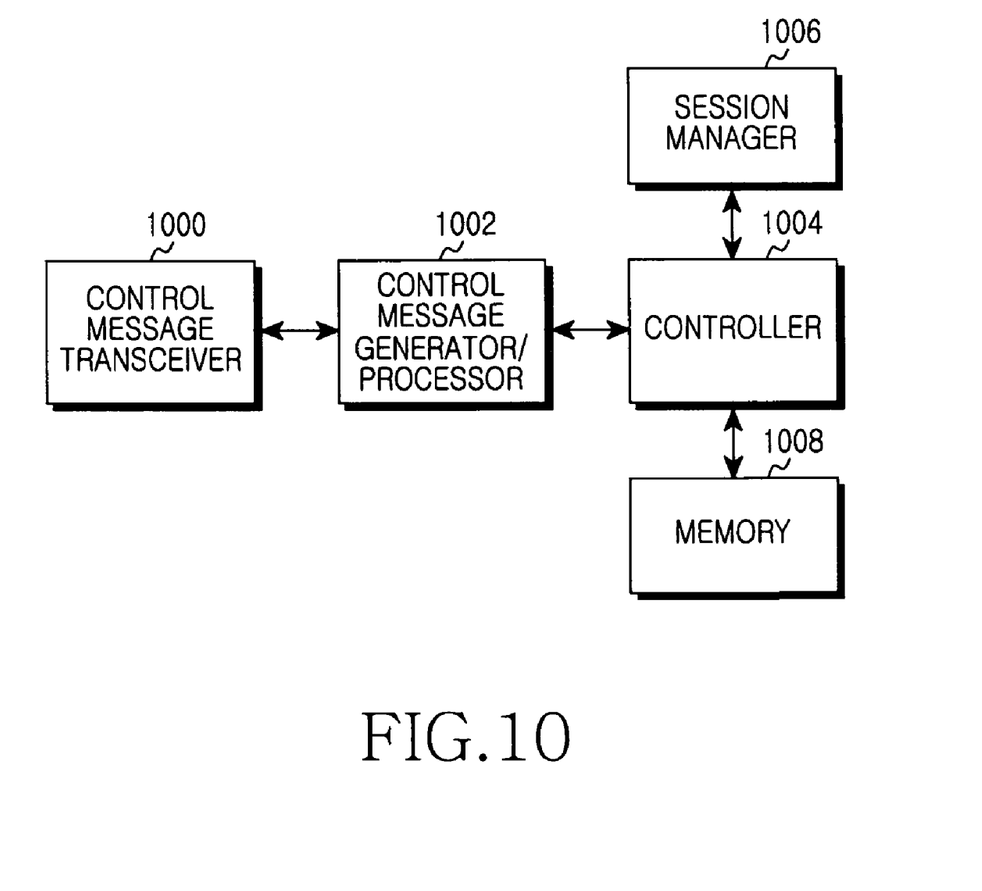
FIG. 10 illustrates a slave modem inside a dual modem mobile communication terminal according to an embodiment of the present invention.

FIG. 10 illustrates a slave modem inside a dual modem mobile communication terminal according to an embodiment of the present invention.

Referring to FIG. 10, the slave modem includes a control message transceiver 1000, a control message generator/processor 1002, a controller 1004, a session manager 1006, and a memory 1008.

Referring to FIG. 10, the control message transceiver 1000 outputs a control message input from the control message generator/processor 1002 to a host modem connected via a connection memory and provides a control message input from the host modem via the connection memory to the control message generator/processor 1002.

The control message generator/processor 1002 generates a control message including information or a packet input from the controller 1004 to provide the control message to the control message transceiver 1000 under control of the controller 1004 and extracts information or a packet from the control message input from the control message transceiver 1000 to provide the same to the controller 1004.

When attribute information and QoS information of a packet are input from the host modem via the control message generator/processor 1002, the controller 1004 is allocated an IP address from an IP network and changes a source IP address inside the attribute information to the allocated IP address. In addition, the controller 1004 provides the QoS information to the session manager 1006 to control the session manager 1006 to set a radio bearer to be used for packet transmission based on the QoS information. Accordingly, when the session manager 1006 sets a radio bearer for the packet and provides session ID information corresponding to the set radio bearer to the controller 1004, the controller 1004 maps the session ID information to the changed attribute information to add the same to a packet filter lift for the slave modem of the memory 1008. In addition, the controller 1004 provides attribute information before the change, the session ID information, and an IP address of the slave modem to the control message generator/processor 1002 to control the control message generator/processor 1002 to generate a control message including the information. The control message generated through the control message generator/processor 1002 is transmitted to the host modem via the control message transceiver 1000.

In addition, the controller 1004 receives a packet and attribute information of the packet from the host modem via the control message generator/processor 1002 and determines the packet filter list for the slave modem stored in the memory 1003 to determine session ID information mapped to the attribute information of the packet. The controller 1004 then provides the packet and the determined session ID information to the session manager 1006 to control the session manager 1006 to transmit the packet to a network via a radio bearer corresponding to the session ID information.

In addition, when a packet received from a network is input via the session manager 1006, the controller 1004 provides the packet to the control message generator/processor 1002 to control the control message generator/processor 1002 to generate a control message including the packet. The control message generated through the control message generator/processor 1002 is transmitted to the host modem via the control message transceiver 1000.

The session manager 1006 receives a packet and session ID information from the controller 1004 and transmits the received packet to a network via a corresponding radio bearer under control of the controller 1004. In addition, the session manager 1006 receives QoS information of a packet from the controller 1004, sets a radio bearer to be used for packet transmission based on the QoS information, and provides session ID information corresponding to the set radio bearer to the controller 1004. In addition, the session manager 1006 provides a packet received from a network to the controller 1004.

The memory 1008 stores and manages the packet filter list for the slave modem.

Though exemplary embodiments of the present invention have been described using a method for directly allocating, at a host modem inside a dual modem mobile communication terminal, an IP address to an external terminal according to a request of the external terminal as an example, the external terminal may be allocated an IP address from an IP network. In this situation, the IP address allocated from the IP network has to be informed to the host modem.

As described above, exemplary embodiments of the present invention supports data communication using both a host modem and a slave modem by additionally driving the slave modem when packet traffic is heavy while a dual modem mobile communication terminal supports data communication using the host modem, such that data communication may be supported at a maximum speed for each modem, and the terminal and the system resource may be efficiently used.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting and receiving, at a host modem, a packet in a mobile communication terminal that includes the host modem and a slave modem, the method comprising:

when a packet is received under a state in which only the host modem is driven, determining whether a buffer count of the host modem is greater than a reference value; and
when the buffer count of the host modem is greater than the reference value, decoding an Internet Protocol (IP) header of the packet to obtain information comprising at least one of a source IP address, a destination IP address, a source port number, a destination port number, and a protocol type, and Quality of Service (QoS) information, generating a control message comprising the obtained at least one of the source IP address, the destination IP address, the source port number, the destination port number, and the protocol type, and the QoS information to transmit to the slave modem, additionally driving the slave modem, and providing the received packet to the slave modem.

2. The method of claim 1, further comprising:
when the packet is received, decoding the IP header of the packet to obtain the at least one of the source IP address, the destination IP address, the source port number, the destination port number, and the protocol type;
when a session Identifier (ID) information mapped to the obtained information exists in a packet filter list for the host modem, transmitting the packet to a network via a radio bearer corresponding to the session ID information; and
when the session ID information mapped to the obtained information exists in a packet filter list for the slave modem, changing the source IP address of the packet to an IP address of the slave modem to reassemble the packet, and generating a control message comprising the reassembled packet to provide to the slave modem.

3. The method of claim 2, wherein whether the buffer count of the host modem is greater than the reference value is determined when the session ID information mapped to the obtained information does not exist in the packet filter list for the host modem or the packet filter list for the slave modem.

4. The method of claim 1, further comprising:
when the buffer count of the host modem is not greater than the reference value, decoding the IP header of the packet to obtain the at least one of the source IP address, the destination IP address, the source port number, the destination port number, and the protocol type, and the QoS information;
setting a radio bearer to be used for packet transmission based on the obtained QoS information;
mapping a session ID information corresponding to the radio bearer to the obtained at least one of the source IP address, the destination IP address, the source port number, the destination port number, and the protocol type to add to a packet filter list for the host modem; and
transmitting the packet to a network via the radio bearer.

5. The method of claim 1, further comprising:
when a control message comprising session ID information and an IP address of the slave modem is received from the slave modem, mapping the session ID information to the obtained at least one of the source IP address, the destination IP address, the source port number, the destination port number, and the protocol type to add to a packet filter list for the slave modem;
changing a source IP address of the received packet to an IP address of the slave modem to reassemble the packet; and
generating a control message comprising the reassembled packet.

6. The method of claim 1, wherein the packet is received from an external terminal connected with the mobile communication terminal via an interface.

7. The method of claim 6, further comprising:
when a Dynamic Host Configuration Protocol (DHCP) request message is received from the external terminal, allocating an IP address to the external terminal; and
transmitting a DHCP response message comprising the allocated IP address to the external terminal.

8. The method of claim 7, further comprising:
when a control message comprising a packet from a network is received from the slave modem, changing a destination IP address of the packet from the network into the IP address allocated to the external terminal to reassemble the packet; and
transmitting the reassembled packet to the external terminal.

9. A method for transmitting and receiving, at a slave modem, a packet in a mobile communication terminal that includes a host modem and the slave modem, the method comprising:
when a buffer count of the host modem is greater than a reference value under a state in which only the host modem is driven and a control message comprising at least one of a source Internet Protocol (IP) address, a destination IP address, a source port number, a destination port number, and a protocol type of a packet, and Quality of Service (QoS) information is received from the host modem, driving the slave modem and being allocated an IP address from an IP network;
setting a radio bearer to be used for packet transmission based on the QoS information; and
generating a response control message comprising session Identifier (ID) information corresponding to the radio bearer and the allocated IP address, and transmitting the response control message to the host modem.

10. The method of claim 9, further comprising:
changing a source IP address of the packet to the allocated IP address; and
mapping the session ID information corresponding to the radio bearer to the changed at least one of the source IP address, the destination IP address, the source port number, the destination port number, and the protocol type to add the session ID information to a packet filter list for the slave modem.

11. The method of claim 10, further comprising:
receiving a control message comprising the packet from the host modem;
decoding an IP header of the packet to obtain at least one of a source IP address, a destination IP address, a source port number, a destination port number, and a protocol type;
determining session ID information mapped to the obtained information from the packet filter list for the slave modem; and
transmitting the packet to a network via the radio bearer corresponding to the session ID information.

12. The method of claim 9, further comprising, when a packet is received from a network, generating a control message comprising the packet from the network to transmit to the host modem.

13. An apparatus for transmitting and receiving, at a host modem, a packet in a mobile communication terminal that includes the host modem and a slave modem, the apparatus comprising:
a packet transceiver configured to receive a packet;

a controller configured to, when a packet is received under a state in which only the host modem is driven, determine whether a buffer count of the host modem is greater than a reference value and, when the buffer count of the host modem is greater than the reference value, additionally drive the slave modem and output the received packet to a control message processor in order to provide the received packet to the slave modem;

a packet processor configured to decode an IP header of the packet to obtain at least one of a source IP address, a destination IP address, a source port number, a destination port number, and a protocol type, and Quality of Service (QoS) information; and a control message processor configured to, when the buffer count of the host modem is greater than the reference value, generate a control message comprising the obtained at least one of the source IP address, the destination IP address, the source port number, the destination port number, and the protocol type, and the QoS information to transmit to the slave modem, and receive a control message comprising session ID information and an IP address of the slave modem from the slave modem.

14. The apparatus of claim 13, further comprising:
a packet processor configured to, when the packet is received, decode the IP header of the packet to obtain the at least one of the source IP address, the destination IP address, the source port number, the destination port number, and the protocol type;
a memory configured to store at least one of a packet filter list for the host modem and a packet filter list for the slave modem;
a session manager configured to, when session ID information mapped to the obtained information exists in the packet filter list for the host modem, transmit the packet to a network via a radio bearer corresponding to the session ID information;
a packet reassembler configured to, when the session ID information mapped to the obtained information exists in the packet filter list for the slave modem, change the source IP address of the packet to an IP address of the slave modem to reassemble the packet; and
the control message processor configured to generate a control message comprising the reassembled packet to provide to the slave modem.

15. The apparatus of claim 14, wherein the controller is configured to determine whether the session ID information mapped to the obtained information exists in the packet filter list for the host modem or the packet filter list for the slave modem and, when the session ID information mapped to the obtained information does not exist in the packet filter list for the host modem or the packet filter list for the slave modem, determine whether the buffer count of the host modem is greater than a reference value.

16. The apparatus of claim 13, further comprising:
a packet processor configured to decode an IP header of the packet to obtain at least one of the source IP address, the destination IP address, the source port number, the destination port number, and a protocol type, and the QoS information; and
a session manager configured to, when the buffer count of the host modem is not greater than the reference value, set a radio bearer to be used for packet transmission based on the obtained QoS information and transmit the packet to a network via the radio bearer,
wherein the controller is configured to map session ID information corresponding to the radio bearer to the obtained at least one of the source IP address, the destination IP address, the source port number, the destination port number, and the protocol type to add to the packet filter list for the host modem.

17. The apparatus of claim 13, further comprising:
a packet reassembler configured to change the source IP address of the received packet to an IP address of the slave modem to reassemble the packet,
wherein the controller is configured to map the session ID information to the obtained at least one of the source IP address, the destination IP address, the source port number, the destination port number, and the protocol type to add to the packet filter list for the slave modem, and
the control message processor is configured to generate a control message comprising the reassembled packet to transmit to the slave modem.

18. The apparatus of claim 13, wherein the packet is received from an external terminal connected with the mobile communication terminal via an interface.

19. The apparatus of claim 18, further comprising a Dynamic Host Configuration Protocol (DHCP) processor configured to, when a DHCP request message is received from the external terminal, allocate an IP address to the external terminal and generate a DHCP response message comprising the IP address allocated to the external terminal.

20. The apparatus of claim 19, further comprising:
a control message processor configured to receive a control message comprising a packet from a network from the slave modem; and
a packet reassembler configured to change a destination IP address of the packet from the network to the IP address allocated to the external terminal to reassemble the packet,
wherein the packet transceiver is configured to transmit the reassembled packet to the external terminal.

21. An apparatus for transmitting/receiving, at a slave modem, a packet in a mobile communication terminal that includes a host modem and the slave modem, the apparatus comprising:
a control message transceiver configured to, as a buffer count of the host modem is greater than a reference value under a state in which only the host modem is driven, receive a control message comprising at least one of a source Internet Protocol (IP) address, a destination IP address, a source port number, a destination port number, and a protocol type of a packet, and Quality of Service (QoS) information from the host modem;
a controller configured to be allocated an IP address from an IP network when the control message is received;
a session manager configured to set a radio bearer to be used for packet transmission based on the QoS information; and
a control message processor configured to generate a response control message comprising session Identifier (ID) information corresponding to the radio bearer and the allocated IP address and transmit the response control message to the host modem.

22. The apparatus of claim 21, further comprising a memory configured to store a packet filter list for the slave modem,
wherein the controller is configured to change the source IP address of the packet to the allocated IP address and map the session ID information corresponding to the radio bearer to the changed at least one of the source IP address, the destination IP address, the source port number, the destination port number, and the protocol type to add to the packet filter list for the slave modem.

23. The apparatus of claim 22, wherein the control message transceiver is configured to receive a control message comprising the packet from the host modem, the control message processor is configured to decode an IP header of the packet to obtain at least one of the source IP address, the destination IP address, the source port number, the destination port number, and the protocol type, the controller is configured to determine the session ID information mapped to the obtained information in the packet filter list for the slave modem, and the session manager is configured to transmit the packet to a network via a radio bearer corresponding to the session ID information.

24. The apparatus of claim 21, wherein the session manager is configured to receive a packet from a network, and the control message processor is configured to generate a control message comprising the packet from the network to transmit to the host modem.

* * * * *